United States Patent Office 3,277,136
Patented Oct. 4, 1966

3,277,136
PREPARATION OF ORGANIC SILICON
DERIVATIVES
Rene Jean Henri Thiesse, Oullins, Rhone, France, assignor to Rhone-Poulenc S.A., Paris, France, a French body corporate
No Drawing. Filed May 21, 1962, Ser. No. 196,448
Claims priority, application France, May 29, 1961, 863,191
4 Claims. (Cl. 260—448.8)

The present invention relates to a new process for the preparation of silanes, polysilanes and polysiloxanes, in which the hydrogen atoms of compounds of such types are replaced by hydrocarbonoxy groups or by both hydrocarbonoxy groups and hydrocarbon groups.

Various methods have already been proposed for the preparation of these products. One of the commonest consists in reacting silanes, polysilanes and polysiloxanes having a Si—Cl bond with a hydroxy organic derivative. This reaction may be typically represented as follows:

$$SiCl_4 + 4R'OH \longrightarrow Si(OR')_4 + 4HCl$$

or

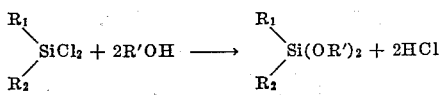
$$\begin{array}{c}R_1\\ \diagdown\\ SiCl_2 + 2R'OH \longrightarrow\\ \diagup\\ R_2\end{array} \begin{array}{c}R_1\\ \diagdown\\ Si(OR')_2 + 2HCl\\ \diagup\\ R_2\end{array}$$

the symbols $R_1$, $R_2$ and $R'$ representing hydrocarbon radicals.

This reaction may be effected in the presence of a solvent medium which is inert under the operating conditions, or in the presence of an acid acceptor, such as pyridine. It generally proceeds well when R'OH is a lower alcohol. However, when R'OH represents a hydroxy compound having low reactivity, for example higher alcohols and phenols, the reaction is slow.

It has now been found that reactions of the foregoing type are facilitated by the presence in the reaction medium of a small quantity of dimethylformamide so that the reaction may then be applied with advantage to hydroxy organic compounds having low reactivity.

According to the present invention, therefore, there is provided a process for the preparation of silanes, polysilanes and polysiloxanes, in which the hydrogen atoms of such type compounds are replaced by hydrocarbonoxy groups or by both hydrocarbonoxy groups and hydrocarbon groups, which comprises reacting a chlorosilane, a chloropolysilane or a chloropolysiloxane with an organic hydroxy compound in the presence of dimethylformamide.

It has been found that a proportion of 0.05% to 1% by weight dimethylformamide, calculated on the total reaction mixture is sufficient to accelerate the speed of reaction considerably and to improve the yields of the desired products. Since such low proportions are effective, it is clear that the effect of the dimethylformamide is catalytic.

Chlorosilanes, chlorinated polysilanes and chlorinated polysiloxanes which may be employed in the present invention may have any of the following general formulae:

$$R_nSiCl_{4-n} \quad (I)$$

$$R_xSiCl_{3-x}(R_ySiCl_{2-y})_mR_zSiCl_{3-z} \quad (II)$$

$$R_xSiCl_{3-x}(-OSiR_yCl_{2-y})_m-OSiR_zCl_{3-z} \quad (III)$$

in which $n$, $x$ and $z$ are each 0, 1, 2 or 3, $y$ and $m$ are 0, 1 or 2 and the sum $x+my+z$ is lower than $6+2m$, and each R represents a lower alkyl, lower alkenyl, mononuclear alicyclic, aromatic or mononuclear aralkyl radical. The radicals R may be, for example, methyl, ethyl, isopropyl, vinyl, allyl, cyclopentyl, cyclohexyl, cyclopentenyl, cyclohexenyl, phenyl, benzyl or tolyl radicals. The various symbols R of each formula may represent identical or different radicals.

Suitable such compounds accordingly include silicon tetrachloride, the methylchlorosilanes, the phenylchlorosilanes, the methylphenylchlorosilanes, vinyltrichlorosilane, hexachlorodisilane, octachlorotrisilane and hexachlorodisiloxane.

Suitable organic hydroxy compounds according to the present invention include higher aliphatic alcohols, phenolic compounds such as phenol itself, alkylphenols such as cresols, xylenols, butylphenols and octylphenols, and aromatic alcohols.

The catalytic action of dimethylformamide in the above described reaction is entirely unexpected, because it is known that the reaction of silicon tetrachloride on an organic hydroxy compound in dimethylformamide does not give an orthosilicate but gives a silanol which condenses to give polysiloxane.

The operating conditions are not critical.

A convenient method of operation consists in adding dimethylformamide to the hydroxy compound, optionally in solution in an inert solvent such as benzene or toluene, and then adding with stirring the chlorinated silicon derivative. An abundant evolution of hydrochloric acid is very rapidly observed and, in order to accelerate and terminate the evolution, the temperature of the reaction mixture is gradually raised until the evolution of gas ceases. The product is thereafter distilled to separate the excess of reactants and the solvent, if one is employed, and to isolate the ester obtained.

The following examples, in which the parts are by weight, will serve to illustrate the invention:

Example I

Into a 2-liter spherical flask provided with a stirrer, a dropping funnel, a condenser, a thermometer and a gas delivery tube connected to a solid carbon dioxide trap, followed by a water absorber, are introduced at 21° C., 413 parts of dry phenol in solution in 250 parts of toluene, and then 1 part of dimethylformamide. 170 parts of silicon tetrachloride are added in one hour, the temperature falling to 7° C. at the end of the addition, while 92 parts of hydrochloric acid are collected in 3 hours. The product is thereafter heated for 2 hours and reaches a temperature of 125° C., the evolution of hydrochloric acid continuing throughout the heating. In all, 138 parts of hydrochloric acid are collected in the water absorber.

When the excess of toluene and phenol has been eliminated by distillation, there are obtained 415 parts of a product, which is thereafter rectified in vacuo. There are thus obtained 388 parts of tetraphenoxysilane, B.P. 221°–225° C. (C% 71.22, H% 5.02, Si% 7.4), which represents a yield of 97% in relation to that theoretically possible.

When the same experiment is carried out without using dimethylformamide, it is found that after contact for 15 hours at ambient temperature the mixture of phenol and silicon tetrachloride has yielded only 45 parts of hydrochloric acid. When the temperature is raised to the boiling point of the liquid and this temperature is maintained for 4 hours, there are recovered a total of 123 parts of hydrochloric acid. On rectification, 349 parts of tetraphenoxysilane are isolated (yield=87.2%).

Example II

Into an apparatus similar to that of Example I are introduced 620.4 parts of phenol containing 2 parts of dimethylformamide, and 299 parts of methyltrichlorosilane are then added with stirring at 45° C. The evolution of gas immediately commences. At the end of 3 hours, 55 parts of hydrochloric acid have been collected, and the product is then heated for 2½ hours so as to reach a temperature of 120° C. There is collected a total of 198 parts of hydrochloric acid. The contents of the flask are distilled and 312.5 parts of methyltriphenoxysilane are recovered, boiling between 179° C. and 183° C. under 2 mm. Hg (yield=97.3% in relation to that theoretically possible).

A similar experiment, in which dimethylformamide is not used, gives, after heating to 120° C. in 8 hours and rectification, 241 g. of methyltriphenoxysilane (yield 75%).

*Example III*

The procedure of Example II is followed, starting with 387 parts of dimethyldichlorosilane, 620.5 parts of phenol and 2 parts of dimethylformamide. After stirring in the cold for 2 hours 45 minutes, 60 parts of hydrochloric acid are collected. When the mass is raised to 130° C. by heating for 5½ hours, a total of 195 parts of hydrochloric acid is recovered. On distillation of the contents of the flask, there are obtained 695 parts of dimethyldiphenoxysilane (B.P. 126–127° C. under 2 mm. Hg).

A repeat of the experiment without the dimethylformamide gives, after 15 hours, 512 parts of dimethyldiphenoxysilane (yield=70%).

I claim:

1. Process for the production of a silane substituted by at least one hydrocarbonoxy group which comprises reacting, in the presence of 0.05 to 1% by weight of dimethylformamide, a compound of the formula:

$$R_nSiCl_{4-n}$$

in which $n$ is an integer at least 0 and at most 3 and each R is individually selected from the class consisting of methyl, ethyl, isopropyl, vinyl, allyl, cyclopentyl, cyclohexyl, cyclopentenyl, cyclohexenyl, phenyl, benzyl, and tolyl, with a phenol selected from the class consisting of phenol itself and alkylphenols in which the alkyl groups contain not more than 8 carbon atoms.

2. Process according to claim 1 in which the reaction is carried out in an inert solvent.

3. Process for the production of a silane substituted by at least one phenoxy group which comprises reacting, in the presence of 0.05 to 1% by weight of dimethylformamide and in an inert solvent, a compound of the formula:

$$(CH_3)_nSiCl_{4-n}$$

in which $n$ is an integer at least 0 and at most 2, with phenol until evolution of hydrochloric acid has substantially ceased.

4. Process for the production of a silane substituted by at least one phenoxy group which comprises reacting, in the presence of 0.05 to 1% by weight of dimethylformamide and in an inert solvent, a compound of the formula:

$$R_nSiCl_{4-n}$$

in which $n$ is an integer at least 0 and at most 3 and R is alkyl of up to 3 carbon atoms, with phenol.

References Cited by the Examiner

UNITED STATES PATENTS 3,073,856   1/1963   Dodgson _____ 260—488.8

TOBIAS E. LEVOW, *Primary Examiner.*

SAMUEL H. BLECH, *Examiner.*

J. G. LEVITT, *Assistant Examiner.*